United States Patent
Kreitmair-Steck et al.

(10) Patent No.: US 9,266,602 B2
(45) Date of Patent: Feb. 23, 2016

(54) EMPENNAGE OF A HELICOPTER

(71) Applicant: AIRBUS HELICOPTERS DEUTSCHLAND GMBH, Donauworth (DE)

(72) Inventors: Wolfgang Kreitmair-Steck, Munich (DE); Michael Hebensperger, Munich (DE)

(73) Assignee: Airbus Helicopters Deutschland, Donauworth (DE)

( * ) Notice: Subject to any disclaimer, the term of this patent is extended or adjusted under 35 U.S.C. 154(b) by 97 days.

(21) Appl. No.: 14/021,017

(22) Filed: Sep. 9, 2013

(65) Prior Publication Data

US 2014/0070051 A1 Mar. 13, 2014

(30) Foreign Application Priority Data

Sep. 7, 2012 (EP) ..................................... 12400037

(51) Int. Cl.
*B64C 27/00* (2006.01)
*B64C 1/00* (2006.01)
*B64C 1/40* (2006.01)
*B64C 27/82* (2006.01)
*B64D 45/00* (2006.01)

(52) U.S. Cl.
CPC . *B64C 1/40* (2013.01); *B64C 27/82* (2013.01); *B64C 2027/8254* (2013.01); *B64C 2027/8272* (2013.01); *B64C 2027/8281* (2013.01); *B64D 2045/009* (2013.01)

(58) Field of Classification Search
CPC .. B64C 1/40; B64C 27/82; B64C 2027/8272; B64C 2027/8281; B64C 2027/8254; B64C 2045/8281
See application file for complete search history.

(56) References Cited

U.S. PATENT DOCUMENTS

| | | | |
|---|---|---|---|
| 5,306,119 A | 4/1994 | Bandoh | |
| 5,498,129 A * | 3/1996 | Dequin et al. | ............. 415/209.3 |
| 5,566,907 A | 10/1996 | Marze | |
| 5,588,618 A | 12/1996 | Marze | |
| 5,634,611 A | 6/1997 | Marze | |

(Continued)

FOREIGN PATENT DOCUMENTS

| | | |
|---|---|---|
| CN | 102458839 A | 5/2012 |
| EP | 0562527 A1 | 9/1993 |

(Continued)

OTHER PUBLICATIONS

Search Report and Written Opinion; Application No. EP 12400037; dated Feb. 5, 2013.

(Continued)

*Primary Examiner* — Tien Dinh
*Assistant Examiner* — Aaron Rodziwicz
(74) *Attorney, Agent, or Firm* — Brooks Kushman P.C.

(57) ABSTRACT

An empennage (1.1) of a helicopter comprising a ducted counter-torque device with a multi-blade rotor (4) of rotor blades (3) and optional vertical tail fins (1.2). Flow-straightening stators (5) of stationary vanes are disposed substantially in a star configuration parallel to the rotor plane downstream from the rotor (4). A shroud (2.1) of the ducted counter-torque device is sheathed with a composite structure of an outer erosion protecting surface layer (7.1, 8.1) made of a hard plastic or a plastic composite material, and at least one succeeding layer (7.2, 8.2) of an elastomeric damping material.

19 Claims, 5 Drawing Sheets

(56) References Cited

U.S. PATENT DOCUMENTS

| | | | |
|---|---|---|---|
| 6,206,136 B1 * | 3/2001 | Swindlehurst et al. | 181/290 |
| 6,851,515 B2 | 2/2005 | Dussac | |
| 7,779,965 B2 | 8/2010 | Marze | |
| 8,061,962 B2 | 11/2011 | Marze | |
| 2006/0169835 A1 | 8/2006 | Maille et al. | |
| 2009/0014581 A1 * | 1/2009 | Kebrle et al. | 244/17.21 |
| 2012/0034833 A1 * | 2/2012 | Schaube et al. | 442/172 |

FOREIGN PATENT DOCUMENTS

| | | | |
|---|---|---|---|
| EP | 0680871 | A1 | 11/1995 |
| EP | 0680873 | A1 | 11/1995 |
| EP | 1533521 | A1 | 5/2005 |
| EP | 1778951 | A4 | 11/2008 |
| EP | 2071561 | A2 | 6/2009 |
| EP | 1778951 | B1 | 11/2009 |
| WO | 2006122749 | A1 | 11/2006 |
| WO | 2010118860 | A2 | 10/2010 |

OTHER PUBLICATIONS

Chinese Office Action for corresponding Chinese Application No. 201310404561.3, mailed Apr. 27, 2015, 18 pages.

Russian Office Action and English translation for corresponding Application No. 2013149389/11(076892), mailed Apr. 27, 2015, 6 pages.

* cited by examiner

EMPENNAGE OF A HELICOPTER

CROSS REFERENCE TO RELATED APPLICATIONS

This application claims priority to European application No. EP 12 400037.3 filed Sep. 7, 2012, the disclosure of which is incorporated in its entirety by reference herein.

BACKGROUND OF THE INVENTION (1) Field of the Invention

The invention is related to an empennage/fairing structure of a helicopter with a ducted counter-torque device with the features of the preamble of claim 1.

(2) Description of Related Art

Shrouded anti-torque systems for helicopters consist essentially of an empennage structure including a shroud and a ducted fan with an airflow duct and a fan assembly coaxially mounted within the airflow duct. It is a fact, that all anti-Torque Systems for helicopters produce noise additional to the noise of the main rotor. While conventional rear rotors for helicopters are often complex, fragile, and require large rotor diameters, the faired/shrouded anti-torque rotors are smaller because of better aerodynamic efficiency and they eliminate the risk of accidents due to the protection from impacts provided by the fairing.

The fan assembly includes a central hub structure, a number of support struts for mounting of the hub structure in the airflow duct. The support struts usually are elliptical shaped in order to enhance the aerodynamic performance and they may be configured as stators for flow-straightening and thus recovery of rotational energy from the airflow.

The acoustic energy which is emitted from these devices is essentially dependent on the flowing out processes, overflow phenomena of bodies and rotating pressure fields. For shrouded tail-rotors there might be additional sources of noise due to body resonances and cavity effects. While the fan noise is shielded by the nacelle of the helicopter in flight direction, non-optimized shrouded tail-rotors emit still significant amounts of noise to the back and to the sides of the helicopter.

A major source for acoustic energy emitted from shrouded/ducted tail-rotors can be the turbulences between the blade tips and the shroud. The larger the distance between the blade tips and the shroud, the more acoustic energy is produced by these turbulences. This so-called "Clearance Noise" is commonly known as a moderate, but broad-band increase of the noise level. Frank Kameier in "Experimentelle Untersuchung zur Entstehung and Minderung des Blattspitzen-Wirbellärms axialer Strömungsmaschinen. Diss. TU Berlin, Hermann-Föttinger-Institut für Thermo-und Fluiddynamik. Berlin 1994" has shown that there are significant increases of noise levels for specific narrow frequency ranges, if the clearance is more than 0.003 times the rotor diameter.

Various methods have been proposed in the past to reduce the level of the annoying and disturbing noise of the anti-torque devices:

1. The documents U.S. Pat. No. 5,588,618; EP680873 respectively disclose aerodynamic optimization of the support struts and stators in order to reduce the separation of vortices;
2. The documents EP 562527; EP680871 respectively disclose unequal angular spacing of the rotor blades in order to distribute the acoustic noise over a greater number of fundamental frequencies; and
3. The documents U.S. Pat. Nos. 5,634,611; 8,061,962 respectively disclose harmonization of the number and arrangement of rotor blades and stators in order to reduce the interferences between the blades and the stators.

Due to the increase of the number of fundamental frequencies and their harmonics, the noise of the tail structure of the helicopter is a kind of broad band noise which is able to excite a lot of body and cavity resonances. In fact, the tail structure of the helicopter, especially the empennage has turned into a kind of "musical instrument" like a guitar, which is amplifying a broad spectrum of the remaining audible sound.

The document WO 2010 118860 discloses composite components and heat-curing resins and elastomers and relates to a plastic composite component which is formed by a thin hard plastic outer layer, at least one elastomer layer adjoining the former on the inside, and at least one metal and/or plastic carrier layer adjoining said elastomer layer on the inside and made of a fibre reinforced plastic (carbon or glass fibre). This should act among other as an impact protection part, as a splinter protection part or as a protective part against vibrations and vibration damages, against resonance, for the purpose of damping oscillations or for the purpose of acoustic damping of amongst others rotor blades and aircrafts parts.

The document EP2071561 discloses an absorbent structure for rotor noise and a rotor duct. The structure has a separation unit for arranging a porous wall at fixed distance from a rigid baffle made of glass fiber by defining cavities with a height between the porous wall and the baffle, where the height is determined to obtain maximum absorption of acoustic waves emitted at basic frequency. An additional porous wall is arranged in the cavities at intermediate height to obtain maximum absorption for another basic frequency. The porous walls have an absorbent layer made of fine-mesh fence and another absorbent layer made of fiber felt. The application of Helmholtz-Resonators in order to absorb noise and to reduce the sound level of the shrouded tail rotor is suitable to reduce the amplitudes of specific frequencies, i.e. the frequencies for which the resonators are tuned as well as for their harmonics. However it is very difficult—if not impossible—to completely reduce the broad-band noise with stochastic frequencies as it results from the operation of the shrouded tail rotor.

The document US2009014581 A1 discloses a ducted fan for a helicopter with a transverse duct and a counter-torque device supported within the duct. The counter-torque device includes a rotor rotatably mounted within the duct and a stator fixedly mounted within the duct downstream from the rotor. The rotor includes a rotor hub having a rotor axis, and rotor blades extending from the hub. The Rotor blades have a modulated angular distribution about the rotor axis. The stator includes a stator hub, and a plurality of stator vanes distributed around the stator hub. The stator vanes are angularly modulated around the stator hub.

The document U.S. Pat. No. 6,206,136 B1 discloses an absorptive acoustic liner in which the perforated facesheet has a coating of an erosion-resistant material applied thereto. The coating can be applied using a simple spraying process. The acoustic liner can be easily tuned by regulating the thickness of the coating.

BRIEF SUMMARY OF THE INVENTION

It is an object of the invention to reduce the overall sound level of the empennage of a helicopter.

The solution is provided with an empennage of a helicopter according to the features of claim 1. Preferred embodiments of the invention are provided with an empennage of a helicopter according to the subclaims.

According to the invention an empennage of a helicopter comprises a ducted counter-torque device with a multi-blade rotor with rotor blades and optional vertical tail fins. The rotor is actuated by an actuation shaft mounted along a tail boom of the helicopter. Flow-straightening stators of stationary vanes are disposed substantially in a star configuration parallel to the rotor plane downstream from the rotor. A shroud with the ducted tail rotor inside is sheathed with a composite structure of an outer erosion protecting surface layer made of a hard plastic or a plastic composite material, at least one succeeding layer of an elastomeric damping material and preferably at least one load bearing structural layer following the at least one succeeding elastomeric layer.

The inventive empennage reduces the parasitic broad-band noise of a shrouded tail-rotor and prevents cavity and body resonances of the empennage and tail boom structure with a minimum increase in weight and without impact on the aerodynamic drag. The inventive empennage is applicable without weakening the structural elements of the empennage. The invention preferably increases the damping effect of the shroud to reduce the amplifying effect of the empennage and the tail rotor structure as much as possible with the help of a specific composition of composite materials used for the empennage structure and particularly a shroud of the empennage.

The proposed material compositions are efficiently damping the sound and vibrations of the empennage damping the sound and vibrations of the shroud, and thus reduce significantly the excitation of the body and cavity resonances by damping the elements causing, propagating and amplifying parasitic broad-band noise at the inner circumference of the shroud, the rotor blades themselves and the flow-straightening stators in the duct downstream of the rotor. The solution is modular, i.e. different levels of noise reduction might be realized depending on the needs.

According to a preferred embodiment of the invention the layer of elastomeric material succeeding the outer erosion protecting surface layer made of the hard plastic or the plastic composite material is succeeded by at least one further layer made of the plastic composite material or metal each of said at least one further layer made of the plastic composite material or metal being intermixed by one layer of elastomeric material. The at least one further layer made of the plastic composite material or metal is a load bearing structural layer designed to hold the emerging mechanical and aerodynamic loads. The composite material proposed for the damping of the tail rotor noise according to the invention consists essentially of one or several layers of elastomeric material intermixed with either metallic sheets or plastic matrix material reducing the broad-band noise of a shrouded tail rotor.

According to a preferred embodiment of the invention the elastomeric material is treated with a cross linking agent, e.g. materials from the group of peroxides, amines or bi-phenoles, the exact material selection depending on the specific elastomer used and bonded by a thermal process to the matrix material by help of a thermosetting resin e.g. epoxy resin, phenol-formaldehyde-resin, polyester-resin or acrylate-resin. The elastomeric material consists of material like ethylene-propylene-dien-caoutchouc (EPDM), ethylene-acrylate-caoutchouc (EAM), fluor-carbon-caoutchouc (FKM), natural caoutchouc (NR), or elastomeric polyurethane (PU).

According to a further preferred embodiment of the invention the outermost layer of the shroud as well as the surfaces of the rotor blades and the stators may consist preferably of the hard plastic layers, with a thickness between 0.02 and 0.4 mm and with a notch impact strength of at least 40 kJ/m$^2$, preferably more than 60 kJ/m$^2$ in order to protect the composite structure against erosion. This outer layer can consist of e.g. solid polyurethane (PU), or preferably of HMW-polyethylene (HMW-PE), or even more preferably of UHMW-polyethylene (UHMW-PE).

BRIEF DESCRIPTION OF THE SEVERAL VIEWS OF THE DRAWINGS

Preferred embodiments of the invention are outlined by way of example with the following description with reference to the attached drawings.

DETAILED DESCRIPTION OF THE INVENTION

Figure 1:
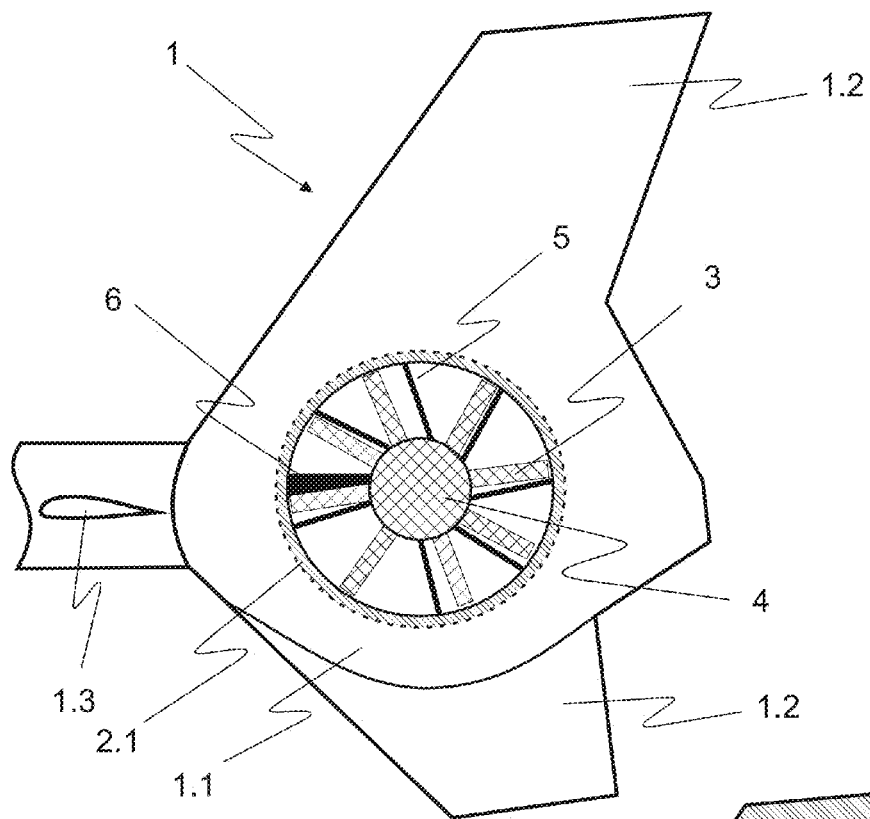
FIG. 1 shows a lateral view of an empennage of a helicopter according to the invention.

According to FIG. 1 a tail boom 1 of a helicopter has an empennage 1.1 comprising a ducted counter-torque device with a multi-blade rotor 4 with rotor blades 3 inside a shroud 2.1. The empennage 1.1 comprises furthermore shrouded vertical tail fins 1.2 for assisting in yaw control. The rotor 4 is actuated by an actuation shaft 6 mounted at the tail boom 1. Two horizontal stabilizers 1.3 are situated left and right to the tail boom 1 for pitch control. Flow-straightening stators 5 are positioned downstream from the rotor 4 inside the shroud 2.1. The flow-straightening stators 5 consist of stationary vanes disposed substantially in a star configuration parallel to the plane of rotor 4.

The shroud 2.1 containing the ducted tail rotor 4 is sheathed with a composite structure (cf. FIG. 5b) for damping vibrations and broad-band noise produced from the operating rotor 4.

Figure 2:
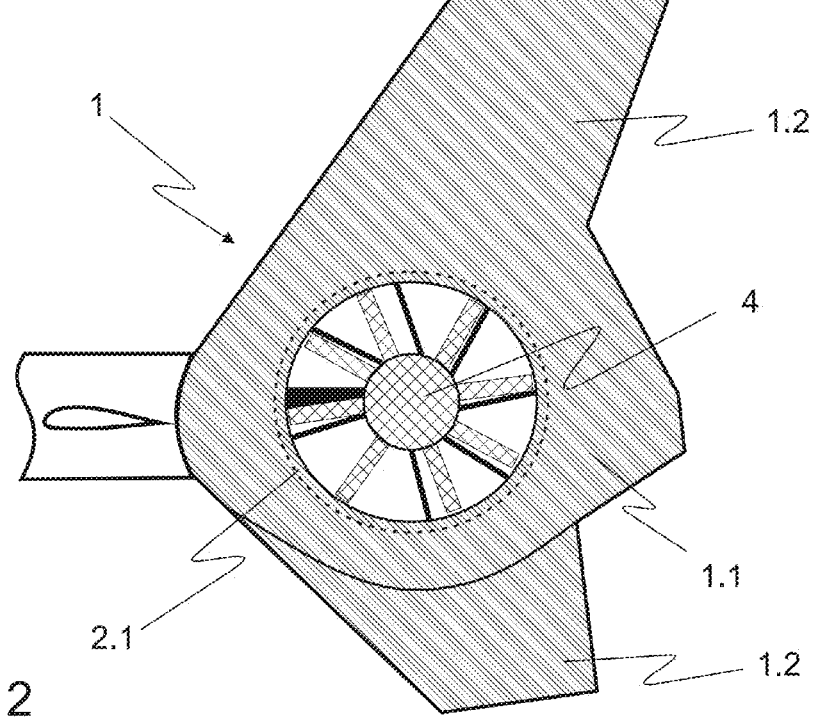
FIG. 2 shows a lateral view of an alternative empennage of a helicopter according to the invention.

According to FIG. 2 corresponding features are referred to with the references of FIG. 1. In addition to the composite structure sheathing the shroud 2.1 containing the ducted tail rotor 4 the empennage 1.1 with the vertical tail fins 1.2 is sheathed with the composite structure according to FIG. 5a or 5b as a vibration and sound damping structure increasing the damping effect concerning the vibrations and the sound of the operating rotor 4.

Figure 3:
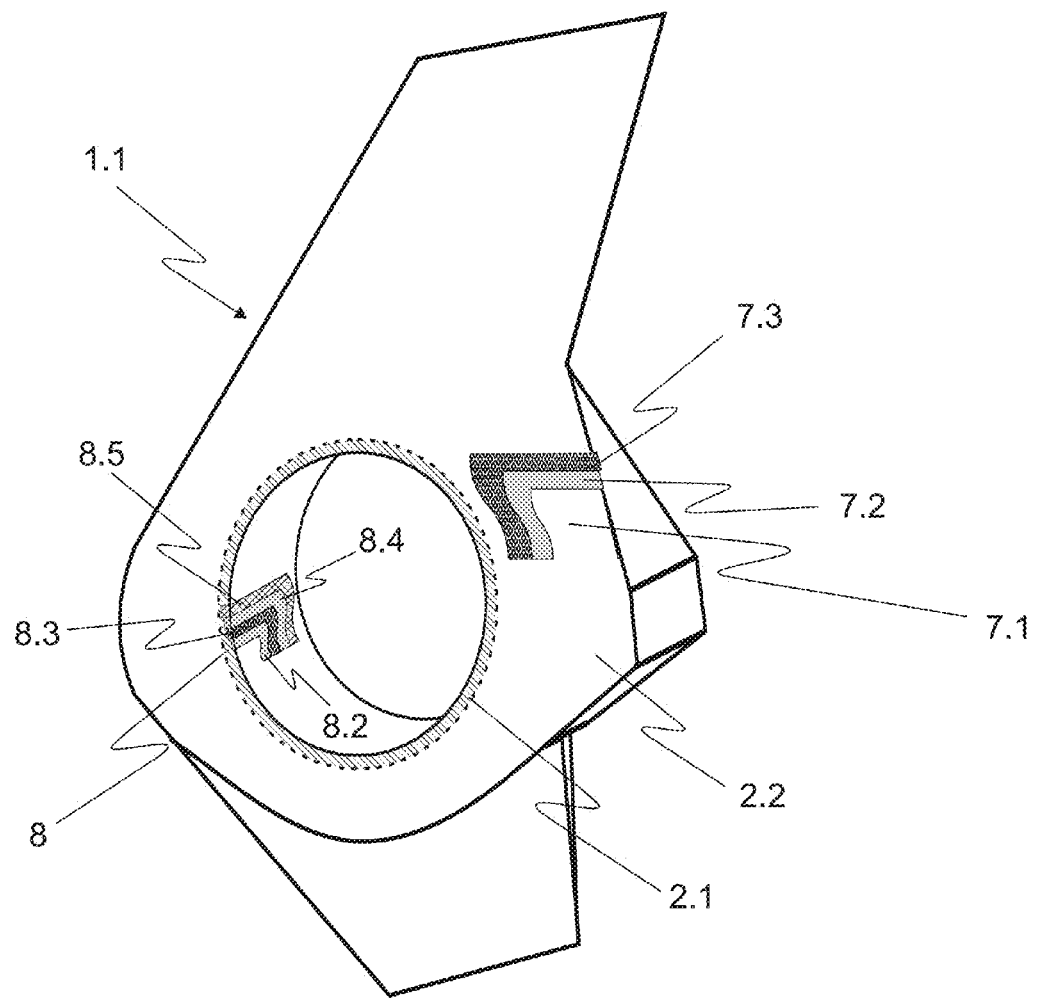
FIG. 3 shows a perspective view with details of a shroud of an empennage of a helicopter according to the invention.

According to FIG. 3 corresponding features are referred to with the references of FIG. 1, 2. The empennage 1.1 with the shrouded tail rotor 4 and the aerodynamically shaped and shrouded vertical tail fins 1.2 is sheathed with the composite structure. The outer wall 2.2 of the empennage 1.1 is provided with top layers 7 containing an outer erosion protecting surface layer 7.1 made of a hard plastic and one elastomeric layer 7.2 and a first structural layer 7.3. The inner circumference of the shroud 2.1 is provided with a top layer structure 8 containing the outer erosion protecting surface layer 8.1 made of a hard plastic succeeded by two elastomeric layers 8.2 and 8.4 with an intermixed layer of a plastic composite structure 8.3, all fixed on a first structural layer 8.5 (see FIG. 5*b*).

According to FIG. 4*a* corresponding features are referred to with the references of FIG. 1-3. A rotor blade 3 with an aerodynamic profile and cross sections changing along its span is sheathed with an elastomeric layer (cf. FIG. 4*b*) between a radial outer cross section a-a and a radial inner cross section b-b, in order to optimize the damping effect for sound and vibration.

Figure 4:
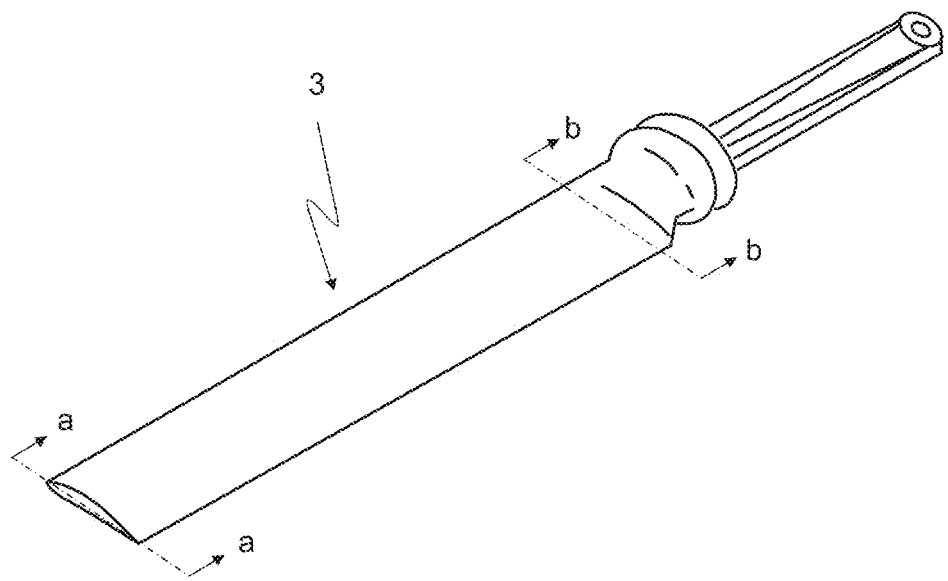
FIG. 4a shows a perspective view of a rotor blade of an empennage of a helicopter according to the invention.
FIG. 4b shows a transversal cross sectional view of the rotor blade of FIG. 4a, FIG. 5a shows a composite structure applied to the empennage of a helicopter according to the invention.
Figure 4:
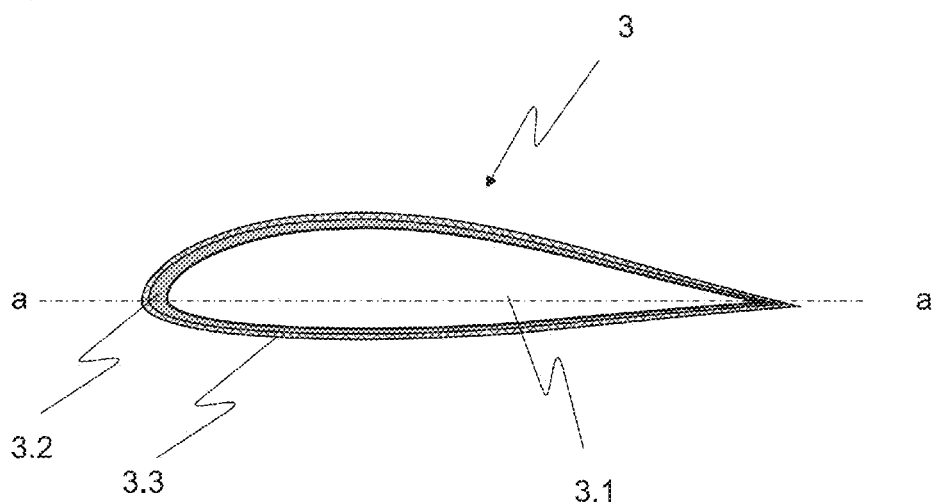

According to FIG. 4*b* corresponding features are referred to with the references of FIG. 1-4*a*. At cross section a-a of the rotor blade 3 a kernel 3.1 is provided made either of metal, e.g. aluminium, or plastic composite. The kernel 3.1 as structural load carrying element serves to hold the loads of the rotor blade 3. The elastomeric layer 3.2 used for damping the vibrations resulting from aerodynamic and mechanical loads is adapted to the aerodynamic profile of an outer erosion protection layer 3.3 with a smooth surface needed for minimum aerodynamic drag of the rotor blade 3.

According to FIG. 5*a* corresponding features are referred to with the references of FIG. 1-4*b*. A composite structure 7 forming the outer wall 2.2 of the empennage 1.1 is provided with an outer erosion protecting surface layer 7.1 made of a hard plastic like e.g. polyurethane, or preferably HMW-polyethylene, or even more preferably UHMW-polyethylene. Alternatively it may be a plastic composite material. The succeeding layer 7.2 is an elastomeric damping element made of material like ethylene-propylene-dien-caoutchouc (EPDM), ethylene-acrylate-caoutchouc (EAM), fluor-carbon-caoutchouc (FKM), natural caotchouc (NR), or elastomeric polyurethane (PU). The elastomeric material is treated with a cross linking agent, e.g. materials from the group of peroxides, amines or bi-phenoles.

Following this succeeding layer 7.2 is a structural layer 7.3 of the composite structure 7 designed to hold any emerging loads. The elastomeric material is bonded to layers 7.1 and 7.3 by a thermal process with the help of a thermosetting resin, e.g. epoxy resin, phenol-formaldehyde-resin, polyester-resin or acrylate-resin.

Figure 5:
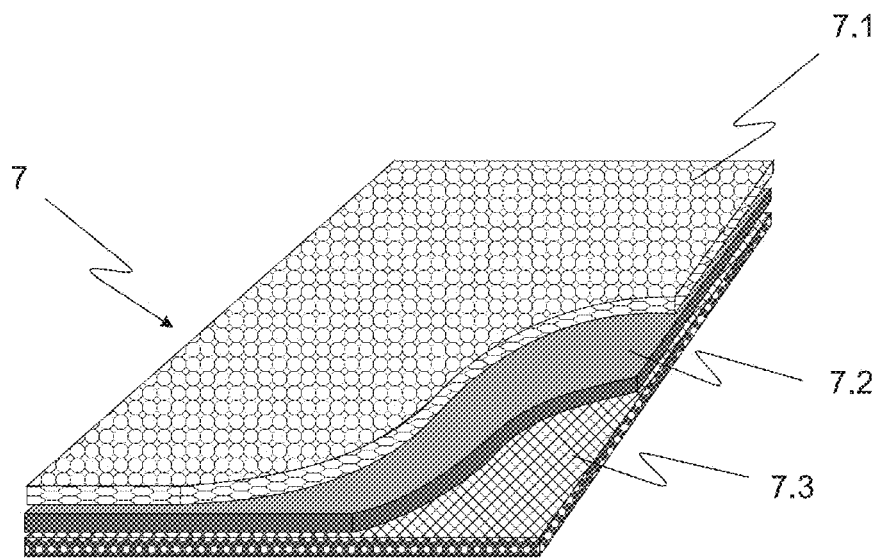
FIG. 5b shows an alternative composite structure applied to the empennage of a helicopter according to the invention.
FIG. 5c shows a cross sectional view of a stator element of an empennage of a helicopter according to the invention.
FIG. 5d shows a cross sectional view of an alternative stator element of an empennage/fairing structure of a helicopter according to the invention.
Figure 5:
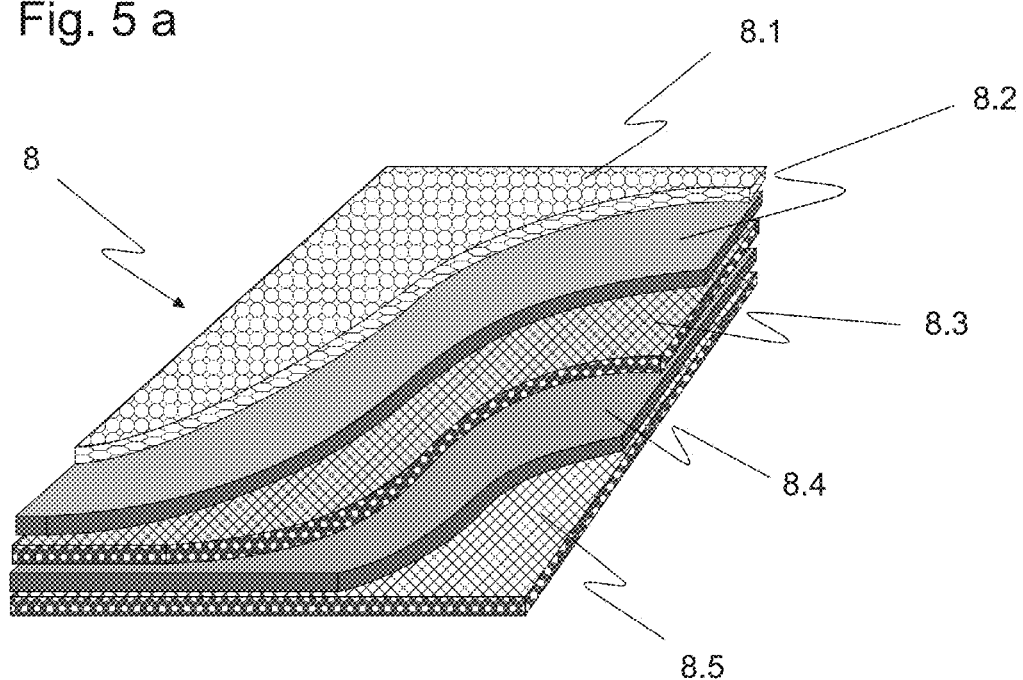
Figure 5:
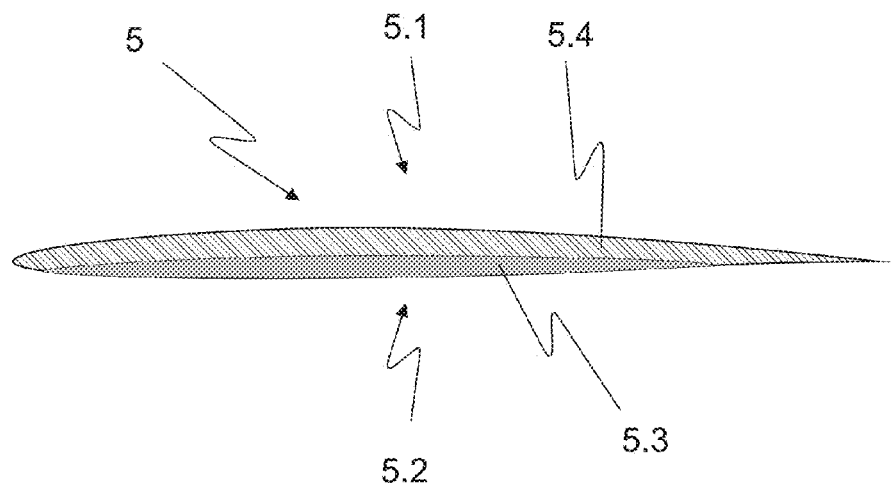
Figure 5:
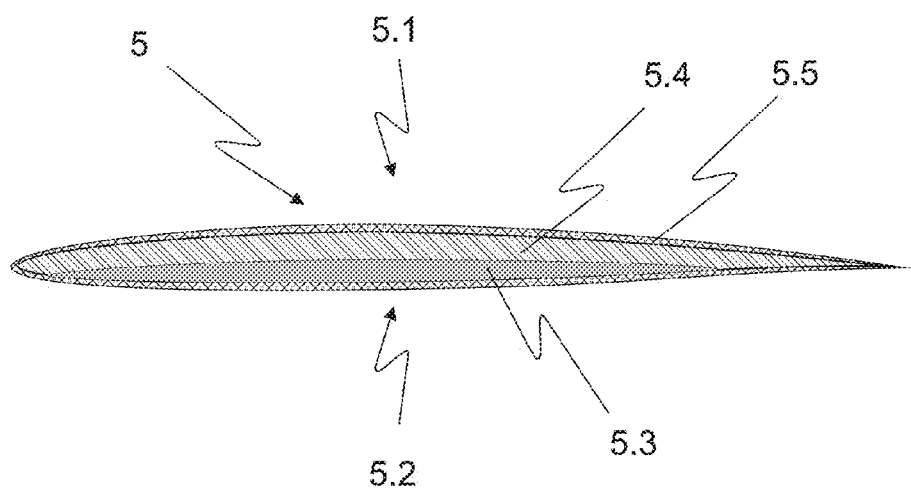

According to FIG. 5*b* corresponding features are referred to with the references of FIG. 1-5*a*. The composite structure 8 for the inner circumference of the shroud 2.1 is built up with an outer erosion protecting surface layer 8.1 made of the hard plastic or the plastic composite material, a succeeding elastomeric layer 8.2 followed by a plastic composite structure 8.3. This layer of plastic composite structure 8.3 follows another elastomeric layer 8.4 in order to increase the damping effect of the inner circumference of the shroud 2.1. The succeeding layer 8.5 is either made from plastic composite or from metal. This succeeding layer 8.5 is capable to hold the inner circumference of the shroud 2.1 against emerging mechanical and aerodynamic loads. The layers 8.1, 8.3, and 8.5 are bonded to the elastomeric layers 8.2 and 8.4 by a thermal process with the help of a thermosetting resin, e.g. epoxy resin, phenol-formaldehyde-resin, polyester-resin or acrylate-resin.

According to FIG. 5*c* a composite structure for the flow-straightening stator elements 5 is built up with a load carrying structural component 5.4 towards the side 5.1, which is directly attacked by the rotating vortex while the side 5.2 with reduced aerodynamic load consists of a layer 5.3 of elastomeric material for damping the emerging vibrations and the produced sound. The structural component 5.4 of the stator element 5 on side 5.1 consists of metal or plastic composite material.

According to FIG. 5*d* corresponding features are referred to with the references of FIG. 1-5*c*. The composite structure for the flow-straightening stator elements 5 is built up with an additional outer layer 5.5 made of polished hard plastics for erosion protection and for reducing the aerodynamic drag. The additional outer layer 5.5 surrounds the structural component 5.4 of metal or plastic composite material and the layer 5.3 of elastomeric material.

REFERENCE LIST

1 tail boom
1.1 empennage
1.2 fins
1.3 horizontal stabilizers
2.1 shroud
2.2 outer wall
3 rotor blade
3.1 kernel
3.2 elastomeric layer
3.3 erosion protection with smooth surface
4 rotor with rotor hub
5 stators
5.1 attacked side
5.2 side with reduced aerodynamic load
5.3 layer of elastomeric material
5.4 load carrying structural stator component
5.5 outer layer of polished hard plastics for erosion protection
6 actuation shaft
7, 8 composite structure
7.1, 8.1 erosion protecting surface layer
7.2, 8.2, 8.4 succeeding elastomeric layer
7.3, 8.5 load bearing structural layer
8.3 plastic composite structure (made of one or more structural layers)

What is claimed is:
1. An empennage of a helicopter comprising:
a ducted counter-torque device with a multi-blade rotor of rotor blades, the rotor being actuated by an actuation shaft mounted along a tail boom, and
flow-straightening stators of stationary vanes disposed substantially in a star configuration parallel to the rotor plane downstream from the rotor inside a shroud of the ducted counter-torque device, wherein at least the shroud of the ducted counter-torque device is sheathed with a composite structure of an outer erosion protecting surface layer made of a hard plastic or a plastic composite material and at least one succeeding layer of an elastomeric damping material;
wherein the shroud of the ducted counter-torque device with the composite structure of the outer erosion protecting surface layer made of the hard plastic or the layer of plastic composite material succeeded by one layer of the elastomeric damping element is further succeeded by a layer of plastic composite material being succeeded by one layer of the elastomeric damping material succeeded by another layer made of the plastic composite material or metal.

2. The empennage according to claim 1, wherein at least one load bearing structural layer is following the at least one succeeding layer.

3. The empennage according to claim 1, wherein outer walls of the empennage are at least partly sheathed with a composite structure of:
   at least one outer erosion protecting surface layer made of a hard plastic or a plastic composite material,
   at least one succeeding layer of an elastomeric damping material, and
   load bearing structural layers following the at least one succeeding layer.

4. The empennage according to claim 1, wherein the rotor blades of the ducted counter-torque device are sheathed with a composite structure of
   at least one outer erosion protecting surface layer made of a hard plastic or a plastic composite material, and
   at least one succeeding layer of an elastomeric damping material.

5. The empennage according to claim 1, wherein the stationary vanes of the flow-straightening stators of the ducted counter-torque device are sheathed with a composite structure of
   at least one outer erosion protecting surface layer made of a hard plastic or a plastic composite material, and
   at least one succeeding layer of an elastomeric damping material attached to the structural stator component.

6. The empennage according to claim 1, wherein the hard plastic is made of polyurethane, or preferably HMW-polyethylene, and/or even more preferably UHMW-polyethylene.

7. The empennage according to claim 1, wherein the elastomeric damping material is made of ethylene-propylene-dien-caotchouc (EPDM), ethylene-acrylate-caoutchouc (EAM), fluor-carbon-caoutchouc (FKM), natural caotchouc (NR) and/or elastomeric polyurethane (PU).

8. The empennage according to claim 1, wherein the composite structure comprises essentially one or several layers of elastomeric material intermixed with either metallic sheets or plastic matrix material.

9. The empennage according to claim 1, wherein the elastomeric material is treated with a cross linking agent, e.g. materials from the group of peroxides, amines or bi-phenoles.

10. The empennage according to claim 1, wherein the layer of elastomeric material is bonded by a thermal process to the matrix material by help of a thermosetting resin, e.g. epoxy resin, phenol-formaldehyde-resin, polyester-resin or acrylate-resin.

11. The empennage according to claim 1, wherein the outer erosion protecting surface layer, the one layer of the elastomeric damping element, the layer of plastic composite material, the another layer of the elastomeric damping material, and the another layer made of the plastic composite material or metal are arranged in sequential order.

12. An empennage of a helicopter comprising:
   a ducted counter-torque device with a multi-blade rotor of rotor blades, the rotor being actuated by an actuation shaft mounted along a tail boom, the ducted counter-torque device having a shroud surrounding the multi-blade rotor, and flow-straightening stators with stationary vanes disposed substantially in a star configuration parallel to the rotor plane downstream from the rotor and inside the shroud;
   wherein the shroud is sheathed with a composite structure having, arranged in sequential order, an outer erosion protecting surface layer, a first elastomeric damping element layer, an intermediate composite structure layer, a second elastomeric damping element layer, and an inner load bearing structural layer;
   wherein the outer erosion protecting surface layer is formed from one of a hard plastic or a plastic composite material; and
   wherein the inner load bearing structural layer is formed from one of a plastic composite material or a metal, and is configured to hold an inner circumference of the shroud against mechanical and aerodynamic loads.

13. The empennage according to claim 12, wherein the composite structure of the shroud is configured to damp vibrations and broad-band noise produced by an operating rotor.

14. The empennage according to claim 12, wherein the ducted counter-torque device has outer walls surrounding the shroud and extending outwardly therefrom;
   wherein the outer walls are at least partially sheathed in a composite structure having, arranged in sequential order, at least one outer erosion protecting surface layer, at least one succeeding layer of an elastomeric damping material, and a load bearing structural layers following the at least one succeeding layer. the outer erosion protecting surface layer formed from one of a hard plastic or a plastic composite material.

15. The empennage according to claim 14, wherein the stationary vanes of the flow-straightening stators of the ducted counter-torque device are sheathed with a composite structure of at least one outer erosion protecting surface layer made of a hard plastic or a plastic composite material, and at least one succeeding layer of an elastomeric damping material attached to the structural stator component.

16. The empennage according to claim 15, wherein the rotor blades of the ducted counter-torque device are formed from a structural load carrying kernel sheathed with a composite structure having at least one outer erosion protecting surface layer and at least one succeeding layer of an elastomeric damping material, the at least one outer erosion protecting surface layer formed from one of a hard plastic or a plastic composite material.

17. The empennage according to claim 12, wherein the stationary vanes of the flow-straightening stators of the ducted counter-torque device are formed with a load carrying structural component on a rotating vortex side of the stationary vanes, and an elastomeric layer on a side with reduced aerodynamic load opposed to the rotating vortex side.

18. The empennage according to claim 17, wherein the stationary vanes of the flow-straightening stators of the ducted counter-torque device are further formed with an additional outer layer of a hard plastic, the additional outer layer surrounding the structural component and the elastomeric layer.

19. The empennage according to claim 12, wherein the rotor blades of the ducted counter-torque device are formed from a structural load carrying kernel sheathed with a composite structure having at least one outer erosion protecting surface layer and at least one succeeding layer of an elastomeric damping material, the at least one outer erosion protecting surface layer formed from one of a hard plastic or a plastic composite material.

* * * * *